(12) United States Patent
Aharon et al.

(10) Patent No.: US 7,697,756 B2
(45) Date of Patent: Apr. 13, 2010

(54) GPU ACCELERATED MULTI-LABEL IMAGE SEGMENTATION (MLS)

(75) Inventors: Shmuel Aharon, West Windsor, NJ (US); Leo Grady, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 847 days.

(21) Appl. No.: 11/098,676

(22) Filed: Apr. 4, 2005

(65) Prior Publication Data

US 2005/0226506 A1 Oct. 13, 2005

Related U.S. Application Data

(60) Provisional application No. 60/561,169, filed on Apr. 9, 2004.

(51) Int. Cl.
*G06K 9/34* (2006.01)
(52) U.S. Cl. .................................... 382/173
(58) Field of Classification Search ........... None
See application file for complete search history.

(56) References Cited

U.S. PATENT DOCUMENTS

| | | | |
|---|---|---|---|
| 6,785,409 B1 * | 8/2004 | Suri | 382/128 |
| 2004/0008886 A1 * | 1/2004 | Boykov | 382/173 |
| 2004/0086185 A1 * | 5/2004 | Sun | 382/224 |

OTHER PUBLICATIONS

Shi et al, Normalized Cuts and Image Segmentation, IEEE Trans. Pattern Analysis and Machine Intelligence, vol. 22, pp. 888-890, Aug. 2000.*
Peter G. Doyle, et al., Random Walks and Electric Networks, Jan. 5, 2000, pp. 1-120.
Leo Grady, et al., Multi-Label Image Segmentation for Medical Applications Based on Graph-Theoretic Electrical Potentials, Proceedings of the 8$^{th}$ ECCV04, Workshop on Computer Vision Approaches to Medical Images Analysis and Mathematical Methods in Biomedical Image Analysis, May 15, 2004, Prague, Czech Republic, Springer-Verlag. M. Sonka I.A. Kakadiaris, and Kybic, Eds., No. LNCS3117 in Lecture Notes I Computer Science, 230-245.
Yuri Boykov, et al., A New Algorithm for Energy Minimization With Discontinuities.
Jens Kruger, et al., Linear Algebra Operators for GPU Implementation of Numerical Algorithms, Press, vol. 22, pp. 908-916.

(Continued)

*Primary Examiner*—Yuzhen Ge
(74) *Attorney, Agent, or Firm*—Donald B. Paschburg; F. Chau & Associates, LLC

(57) ABSTRACT

A method for image segmentation includes specifying seed points in an image of interest, the seed points corresponding to a node in a seed texture, each seed point having a different color. The method includes determining a matrix for each node, including neighboring edge weights of each node, and determining a probability that a node can be characterized as each seed point. The method includes assigning the node the color of a most probable seed point, and outputting a segmentation of the image of interest according to node assignments, wherein the segmentation differentiates portions of the image of interest.

10 Claims, 8 Drawing Sheets

OTHER PUBLICATIONS

Xioajin Zhu, et al., Semi-Supervised Learning Using Gaussian Fields and Harmonic Functions, Proceedings the 12$^{th}$ International Conference of Machine Learning (ICML-2003), Washington, DC 2003.

Xioajin Zhu, et al., Combining Active Learning and Semi-Supervised Learning Using Gaussian Fields and Harmonics Functions, Proceedings of the ICML-2003 Workshop on the Continuum from Unlabeled Data, Washing DC, 2003.

Leo Grady and Eric Schwartz: "Anisotropic interpolation on graphs: The combinatorial Dirichiet problem" Technical Report CAS/CNS-TR-O3-014, 'Online! Jun. 21, 2003, XP002336857 Department of Cognitive and Neural Systems, Boston University, Boston, MA Retrieved from the Internet: URL:eslab.bu.edu/publications/tech-reports/2003/grady2003ani sotropi c-TR . pdf> 'retrieved on Jul. 19, 2005! section "2.3 Combinatorial formulation: Differential operators on graphs" figure 1.

Smolka B et al: "Random walk approach to image enhancement" Signal Processing, Amsterdam, NL, vol. 81, No. 3, Mar. 2001, pp. 465-482, XP004230553 ISSN: 0165-1684 abstract sections "2.2. Random walk model", "2.3. New algorithms of image enhancement" figures 1-3.

Pao H-K et al: "Measuring convexity for figure/ground separati on" Computer Vision, 1999. The Proceedings of the Seventh IEEE International Conference on Kerkyra, Greece Sep. 20-27, 1999, Los Alamitos, CA, USA,IEEE Comput. Soc, US, vol. 2, Sep. 20, 1999, pp. 948-955, XP010350530 ISBN: 0-7695-0164-8 abstract sections "3.1. Convexity Measurement" and "4. Experiments", Appendix "A. Random Walk Formulation" figure 5.

\* cited by examiner

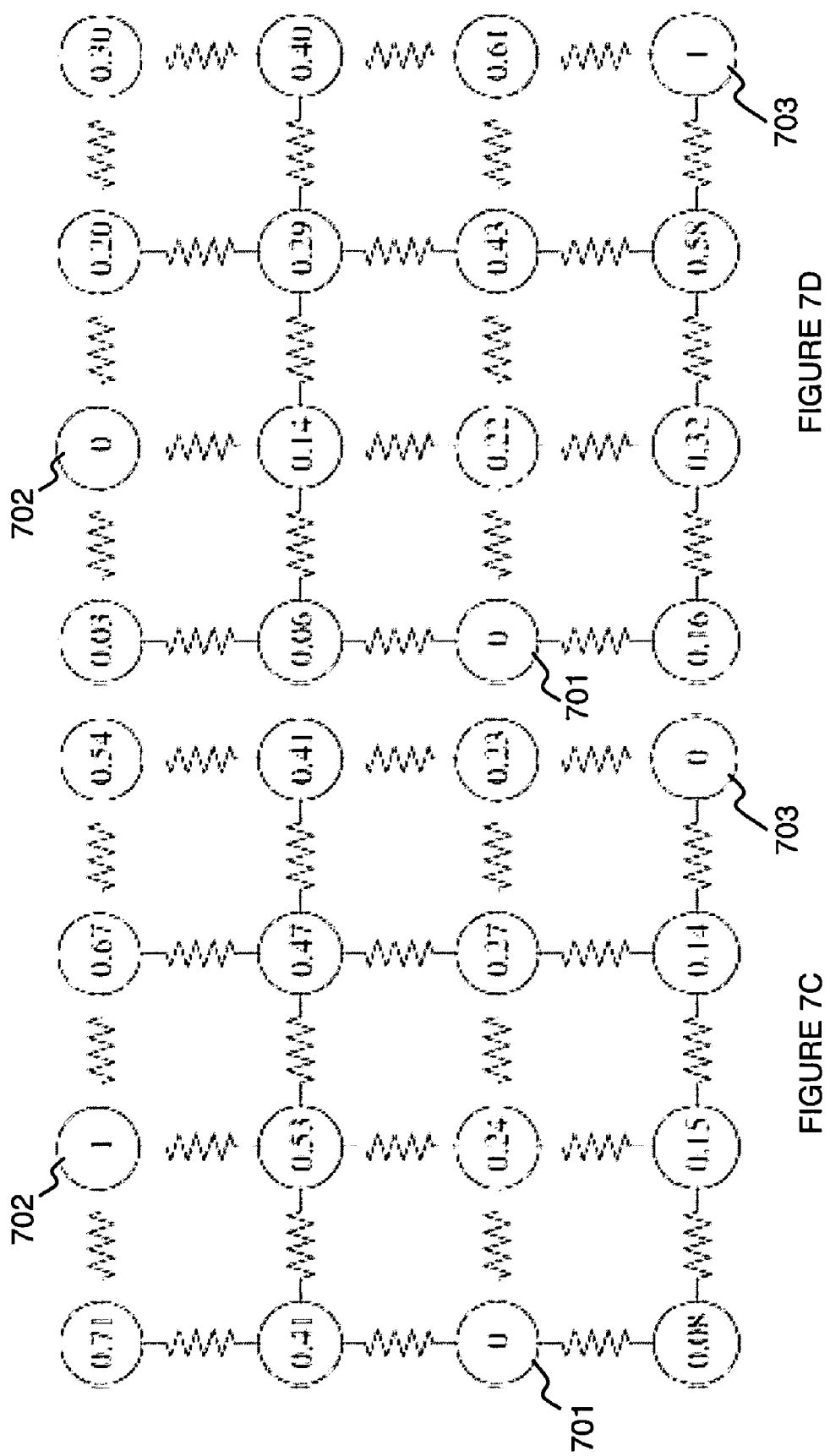

GPU ACCELERATED MULTI-LABEL IMAGE SEGMENTATION (MLS)

This application claims priority to U.S. Provisional Application Ser. No. 60/561,169, filed on Apr. 9, 2004, which is herein incorporated by reference in its entirety.

BACKGROUND OF THE INVENTION

1. Technical Field

The present invention relates to image segmentation, and more particularly to a system and method for finding a multi-label image segmentation based on a specification of labels for pixels.

2. Discussion of Related Art

Segmentation is an important component of many clinical medical imaging applications, including anatomic analysis and modeling, morphological measurement, visualization, and surgical planning. Unfortunately, segmentation is often a challenging problem due to difficulties resulting from noise, limited contrast, and weak boundaries often observed in medical images.

Addressing multi-label image segmentation without recursively applied binary segmentation has been proposed using automated and semi-automated methods. Such random walker methods have been shown to perform better than other segmentation algorithms known to-date. However, the random walker methods are limited by calculation time.

Methods for GPU acceleration of image segmentation have been proposed. However, these methods have disadvantages including leaking of a segmentation through a weak boundary, poor performance in cases where pixel intensities are not clearly divided by a threshold, failure to located object boundaries, etc.

Therefore, a need exists for a system and method for accelerating the performance of a random walker method using a GPU implementation, achieving interactive rates.

SUMMARY OF THE INVENTION

According to an embodiment of the present disclosure, a method for image segmentation comprises specifying a plurality of seed points in an image of interest, the seed points corresponding to a node in a seed texture, each seed point having a different color, determining a matrix for each node, including neighboring edge weights of each node, determining a probability that a node can be characterized as each seed point, assigning the node the color of a most probable seed point, and outputting a segmentation of the image of interest according to node assignments, wherein the segmentation differentiates portions of the image of interest.

The method includes determining edge weights between each node in the seed texture.

Determining the matrix comprises determining a Laplacian matrix having five diagonal bands, wherein four secondary bands hold the edge weights and a main band is a sum of the four secondary bands.

The method includes storing the Laplcian matrix of edge weights as a texture of RGBA channels.

The method includes determining the sum for each node, and determining a vector of the sums for each color, the colors being RGBA channels. Determining the sum for each node further comprises determining a dot product of the neighbors for each node.

The method includes determining the probabilities as a conjugate gradient vector.

According to an embodiment of the present disclosure, a program storage device is provided readable by machine, tangibly embodying a program of instructions executable by the machine to perform method steps for image segmentation. The method comprises specifying a plurality of seed points in an image of interest, the seed points corresponding to a node in a seed texture, each seed point having a different color, determining a matrix for each node, including neighboring edge weights of each node, determining a probability that a node can be characterized as each seed point, assigning the node the color of a most probable seed point, and outputting a segmentation of the image of interest according to node assignments, wherein the segmentation differentiates portions of the image of interest.

According to an embodiment of the present disclosure, a graphics processing unit coupled to a bus of a computer system for processes a Laplacian matrix of edge weights between nodes, each node corresponding to a pixel in an image of interest, the graphics processing unit for determining an output texture comprising vector data for each RGBA channel and a label for each node, wherein the label corresponds to an RGBA channel, the graphics processing unit for outputting a segmentation of the image of interest according to the label for each node.

The Laplacian matrix is a texture representation of the edge weights between nodes stored in a memory device, the memory device being on the graphics processing unit or connected to the bus.

BRIEF DESCRIPTION OF THE DRAWINGS

Preferred embodiments of the present invention will be described below in more detail, with reference to the accompanying drawings:

FIGS. 7A-D are matrices of probabilities according to an embodiment of the present disclosure.

DETAILED DESCRIPTION OF PREFERRED EMBODIMENTS

Figure 1:
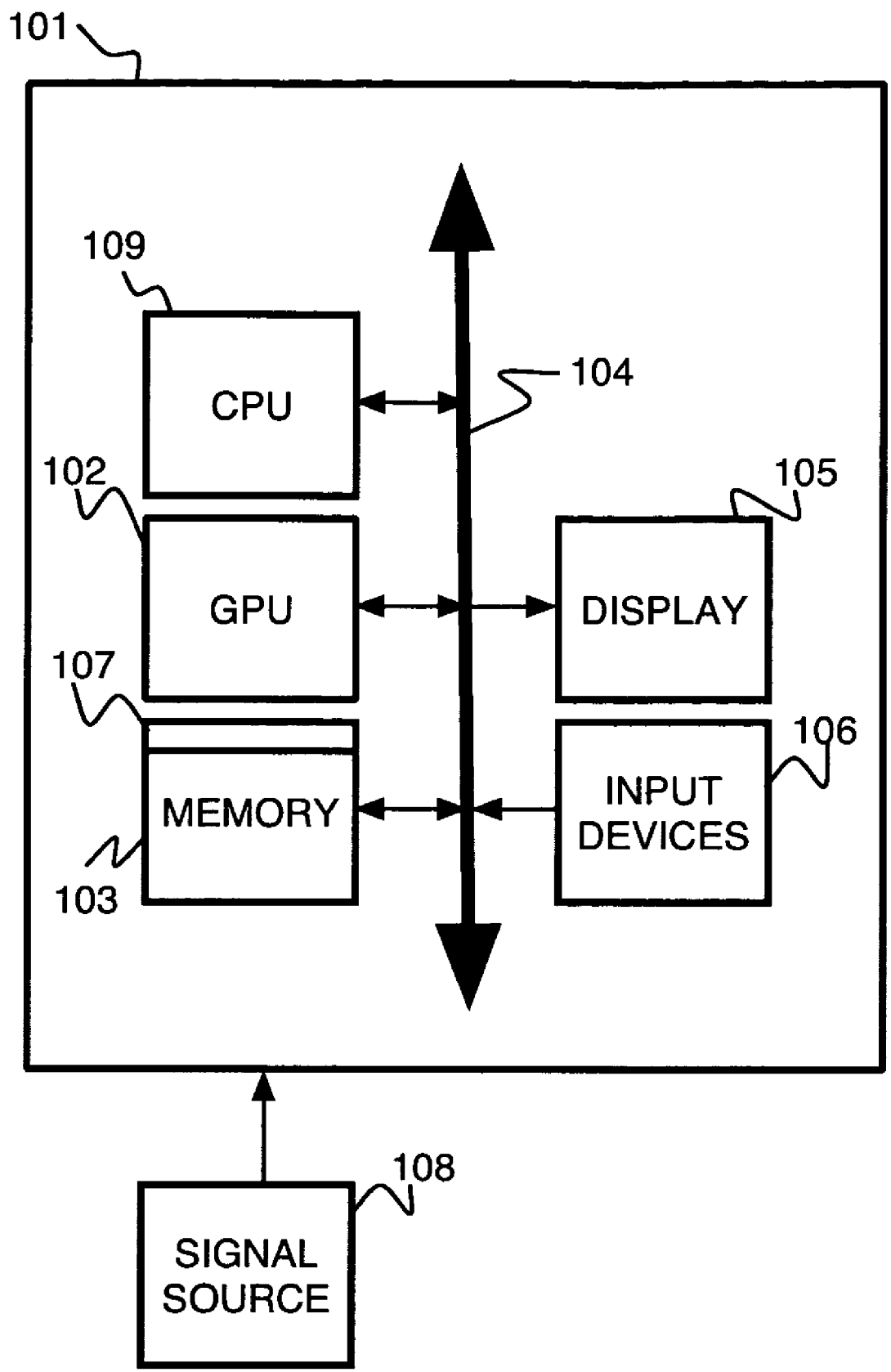
FIG. 1 is diagram of a system according to an embodiment of the present disclosure.

A graphics processing unit (GPU) is implemented to accelerate the performance of a random walker method for image segmentation. The GPU supports floating-point textures; render to (multiple) textures; programmable pixel units using shaders with arithmetic instructions and random access to texture data; parallelism in calculations (SIMD instructions)

by four values per texture element (RGBA); parallelism of pixel units (up to 16); and overall-performance higher than CPU.

A GPU approach results in a central processing unit (CPU) being virtually idle with respect to the image segmentation. There is almost no data transfer from or to graphics memory during the segmentation.

According to an embodiment of the present invention, a method for segmentation packs four different vectors into RGBA texture elements to solve four linear systems simultaneously. The method implements a sparse matrix as texture, handled by a Graphics Processing Unit (GPU). The data transfer between a Central Processing Unit (CPU) and the GPU is limited, decreasing a speed penalty associated with data transfer.

Given a set of pixels or voxels that a user has specified as belonging to K image labels, remaining pixels can be labeled by a multi-label harmonic potential segmentation method. For an arbitrary K, and an image or volume of arbitrary dimensions, consider a person at every voxel starting to walk randomly across the volume until meeting a user-labeled pixel, hereafter a label. The expected percentage of random walkers that first reach a label i are denoted as $p_i$. If the walkers are biased to avoid crossing a sharp image gradient, such as an edge, to reach a neighboring voxel, the probability that a walker starting at a given pixel first strikes label i gives an indication of how strongly that pixel belongs to label i. Once the set of $\{p_1, p_2, \ldots, p_k\}$ is determined for each voxel, that voxel may be assigned to a particular label by choosing the label with the highest probability, the i corresponding to $\max_i(p_i)$.

The MLHPS method solves for a large, sparse, symmetric, positive definite system of equations for each of the K labels input by the user. The sparsity pattern of the matrix is highly structured such that the row corresponding to any one node in the lattice includes only non-zeros with respect to each of its neighboring nodes. Thus, one need not store the matrix explicitly, only the values of the non-zeros. The solution to each system of equations provides the probabilities that a random walker starting form each voxel first reaches a particular user-specified label. The final segmentation is obtained by assigning each voxel to the segment for which the highest probability is determined.

The image data, the marked/unmarked voxels, the systems matrix, the right hand side vectors, and the solution vectors, are all represented on the GPU as floating-point textures. The determinations are made by rendering a rectangle primitive into the result floating-point texture, providing the relevant vectors and matrices as input textures, and performing the determinations n a fragment program. By using different textures as input/output and loading different fragment programs, the flow of the determination may be controlled.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Referring to FIG. 1, according to an embodiment of the present invention, a computer system 101 for implementing the present invention can comprise, inter alia, a graphics processing unit (GPU) 102, a memory 103, an input/output (I/O) interface 104, and a central processing unit (CPU) 109. The memory 103 may reside on the GPU or may be a main memory. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the GPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

GPU Programming

A GPU may be used for tasks other than rendering images. General-purpose GPU programmers map various types of methods to the special architecture of GPUs. As described herein, textures may be treated as data storage and update processes.

For floating-point textures and precision modern graphics cards allocate textures with floating-point precision in each texel. Examples herein are described for 2D textures. 1D and 3D textures can be created as well, but with performance and update-disadvantages, respectively.

Textures are two-dimensional arrays of floating-point values, but each array element (texel) can hold up to four values. A texture is the data structure on the GPU to store vectors or matrices.

The latest graphics cards by NVIDIA and ATI offer 32-bits and 24-bits of floating-point precision respectively. While NVIDIA cards tend to be more accurate, ATI cards are much faster. Unfortunately, neither floating-point implementations are IEEE compliant.

For textures as a render target, updating values in a texture can be done by setting the texture as the render target and rendering a quadrilateral orthogonal onto it. The quadrilateral covers the part of the texture to be updated.

For each covered texel a pixel shader program is executed to update the texel. Shader programs allow sampling other input textures with random access, performing arithmetic operations and dynamic branching in control flow. The higher the shader version, the higher the larger the instruction count.

Operations on textures like element-wise addition and multiplication are the building blocks in general-purpose GPU implementations. Input textures can be bound to sampler units, constants may be passed to the GPU and an output texture needs to be set to store the results.

The following code example (in HLSL) shows how to multiply the corresponding components of two textures. The pixel shader program samples both input textures, performs the arithmetical operation and returns the result at each pixel location.

```
float4 psMultiply (PosTex v) : COLOR {
    float4 v0 = tex2D (sam0, v.TexCoords);
    float4 v1 = tex2D (sam1, v.TexCoords);
    return v0 * v1;
}
```

A more advanced example of an operation on the GPU is the determination of image gradients in shaders for instance.

Figure 2:
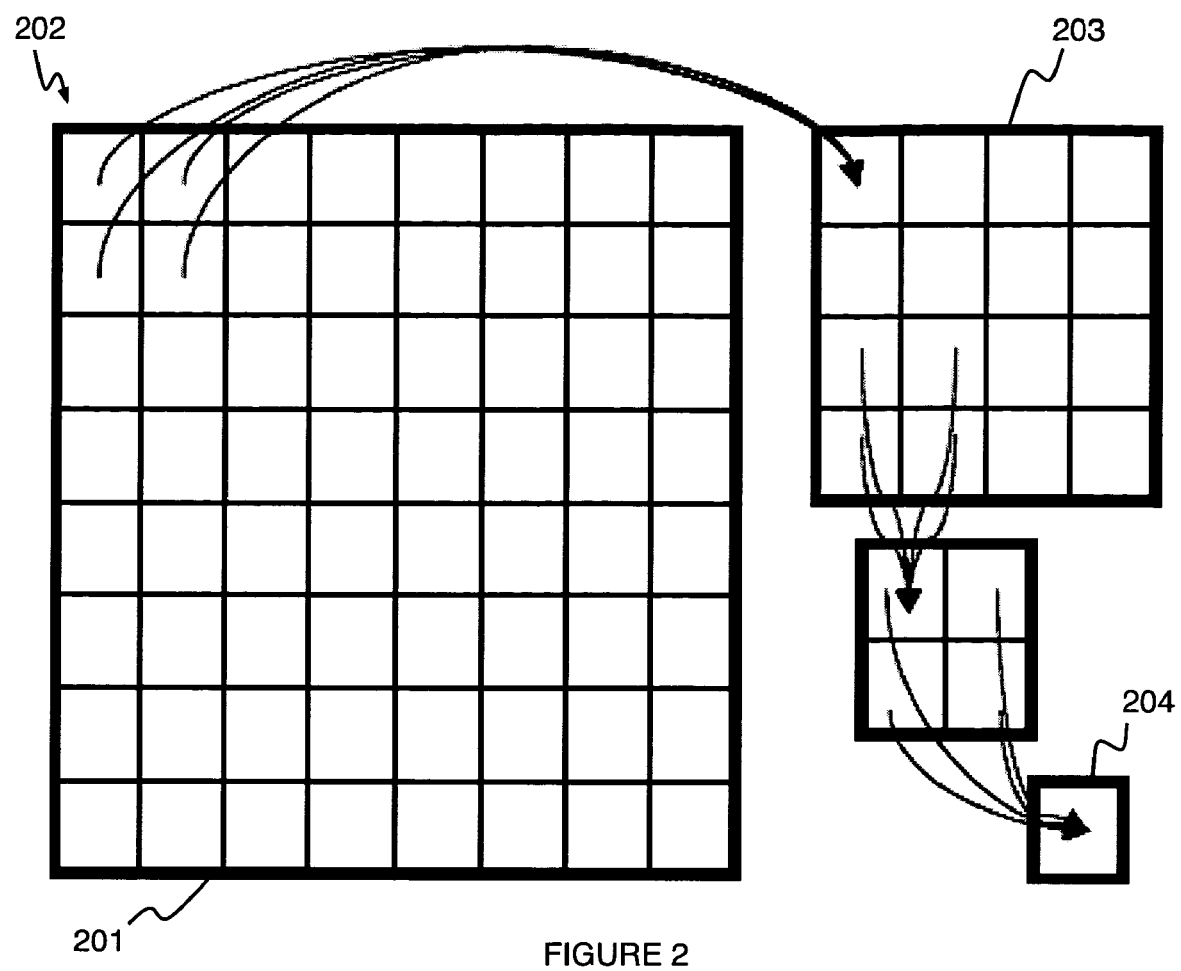
FIG. 2 is an illustration of a reduce operation according to an embodiment of the present disclosure.

One important operation for numerical computations is called the reduce operation, illustrated in FIG. 2. A reduce operation finds the maximum, minimum and average of all values in a texture, as well as the sum of all values. For example, if two vectors are stored as a texture the sum is important in order to calculate a dot product.

The reduce operation takes the original n×n texture 201 and performs the sum/avg/min/max operation on each 2×2 block, e.g., 202 while rendering a texture of n/2×n/2 203. Four values in the original texture are combined to a new one in the smaller texture. This procedure is repeated until the render target is a 1×1 texture 204 that contains the final-result. If the original texture width and height n is a power of two, a complete reduce chain comprises log n rendering passes until the result can be fetched. The implementation is done using a ping-pong buffer alternating two textures as read/write targets. In one pass texture A is used as render target and texture B set as input data, roles are reversed in the following pass.

Instead of combining 2×2 areas, e.g., 202, to an output value, a larger area such as 4×4 can be used.

Referring to vectors, representing a 1D vector as a 2D texture may not appear intuitive, but has performance advantages. The vector data is filled into a 2D texture 1 linearly. Four vectors are put into one texture to fill the RGBA channels according to an embodiment of the present disclosure.

The dot product of two vectors is determined by multiplying the corresponding vector component storing the results in an output texture followed by a reduce operation to sum all the multiplied components together.

Masking may be implemented for algorithms needing certain parts of a texture to be unchanged while updating the rest of the components. To avoid defining a complicated geometry to mask out those regions, the Z-buffer can used to mask out arbitrary regions. This needs the Z-buffer to be at least as large as the texture. Depending on the Z-test function regions to update are either set to 1 and the rest to 0 or vice versa. The Z-test function compares the Z value of the incoming pixel to the one of the render target to determine if the pixel is rendered or discarded. Z-tests can be any of the following comparison tests:

$<, \leq, =, \neq, \geq, >$.

Rendering a quadrilateral in the z=0:5 plane prevents pixels in masked regions from entering the pixel pipeline. These pixels are discarded immediately instead of blocking the pipeline.

To take advantage of the 4-channel parallelism on GPUs there are several ways to pack the data. One option is to pack an n×n texture (with one channel) into an n/2×n/2 texture with four channel. This approach needs additional packing and unpacking passes and the Z-buffer cannot be used as a mask anymore. A packing method not needing packing and unpacking passes with working Z-test has been described with respect to the dot product of two vectors herein.

Random Walker Implementation

Figure 3:
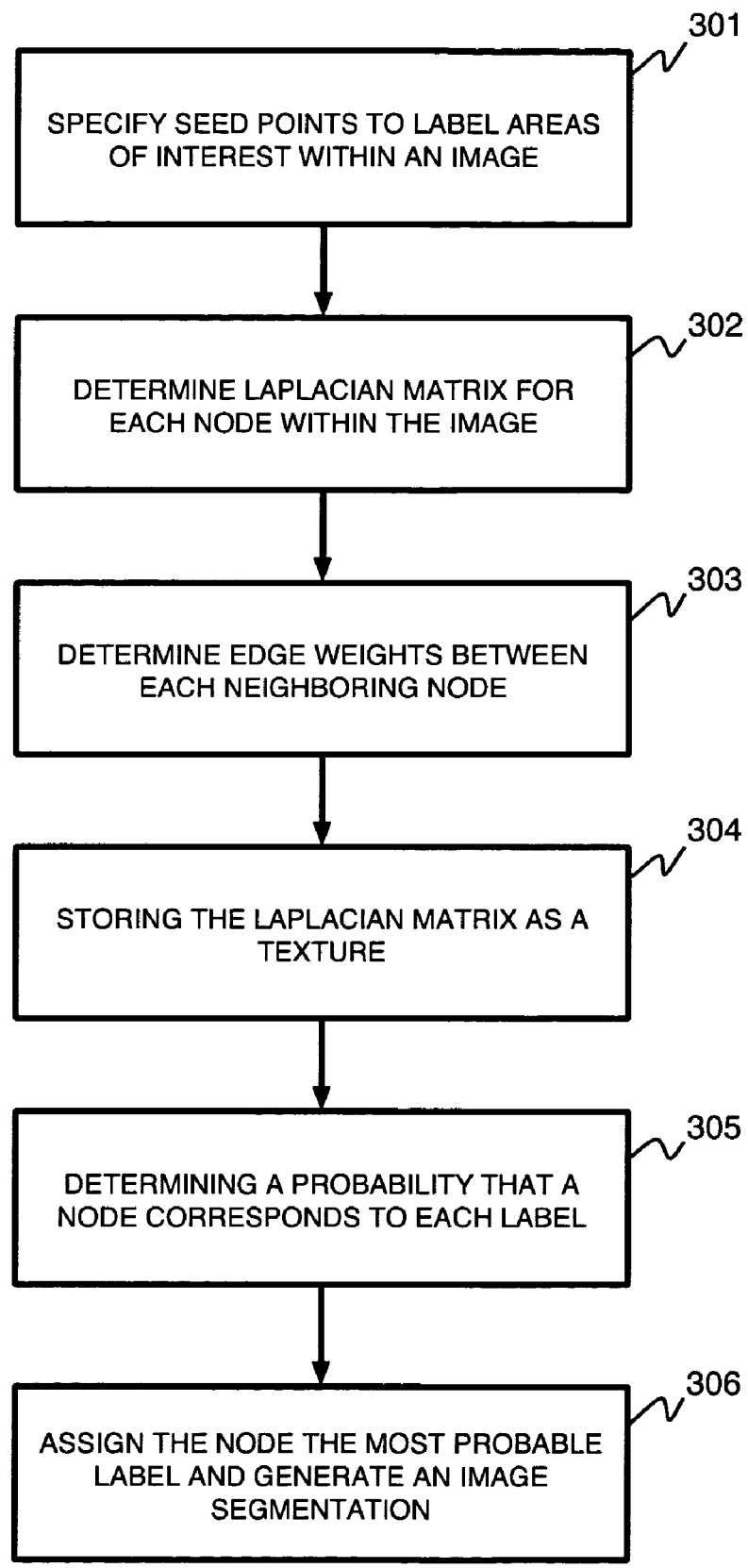
FIG. 3 is a flow diagram of a segmentation method according to an embodiment of the present disclosure.

Referring to FIG. 3, a segmentation method according to an embodiment of the present disclosure includes specifying seed points to mark areas of interest 301. Seed points may be provided manually or automatically by known methods. The method includes storing two or more different seed colors in the RGBA channels of a seed texture 302, multiple colors in one place are prohibited. The method includes determining a Laplacian matrix 303 for each node (e.g., pixel) and storing the Laplacian matrix as a texture representation 304 using the edge weights. A system of linear equations is solved using a conjugate gradients method to give a probability that each node corresponds to each seed point 305. Each node is labeled according to a most probable label and the segmentation is generated 306.

Figures 4A, 4B:
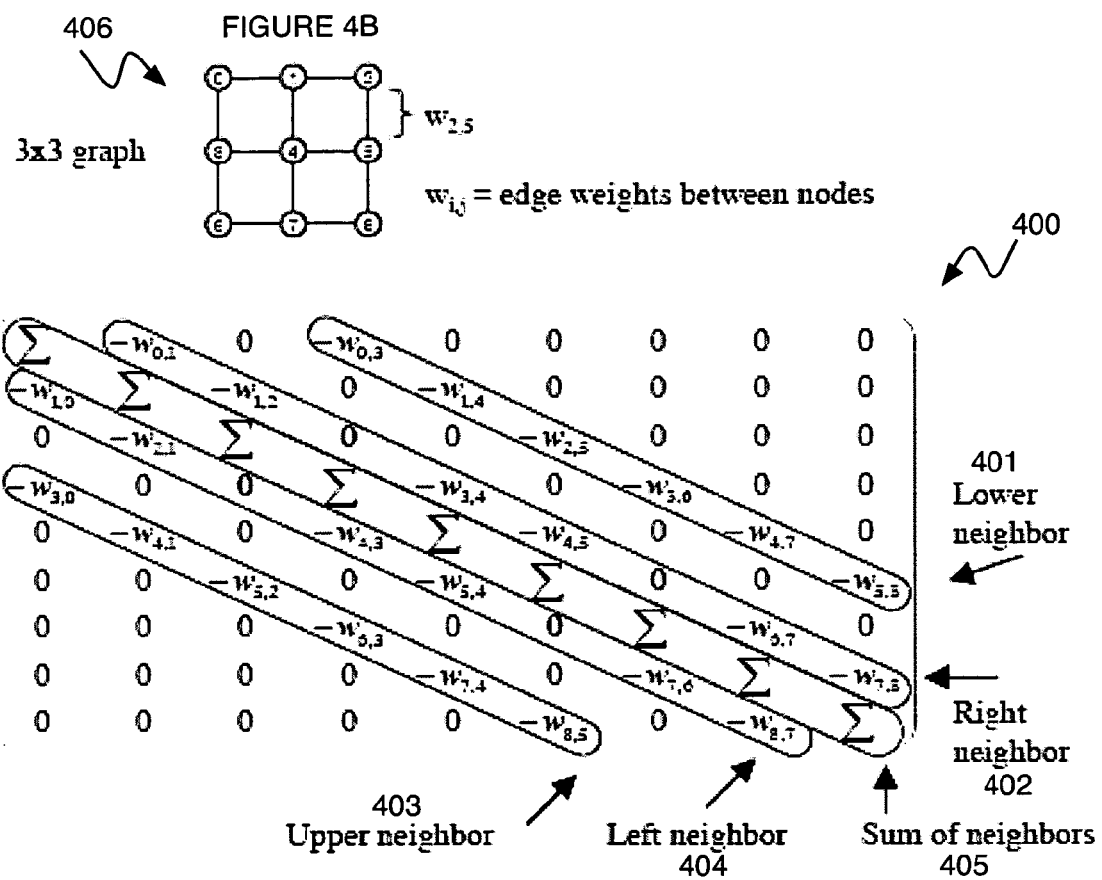
FIG. 4A is a Laplacian matrix corresponding to a 3×3 graph/image according to an embodiment of the present disclosure.
FIG. 4B is a 3×3 graph/image according to an embodiment of the present disclosure.

The structure of the Laplacian matrix 400, for example see FIG. 4A, is suited for a texture representation. In 2D it has five diagonal bands 401-405. The secondary bands 401-404 hold the edge weights to neighboring pixels (nodes in the graph) and the main diagonal band 405 is the sum of the four secondary bands 401-404. FIG. 4B shows an example of a 3×3 image 406.

Since the diagonal 405 is the sum of the secondary diagonals 401-404, values on main diagonal need not be kept. The matrix is saved in a row-wise manner. This corresponds to storing the edge weights to the four neighboring pixels for each pixel. Four values fit to a four channel texture perfectly as illustrated in FIG. 5.

Figure 5:
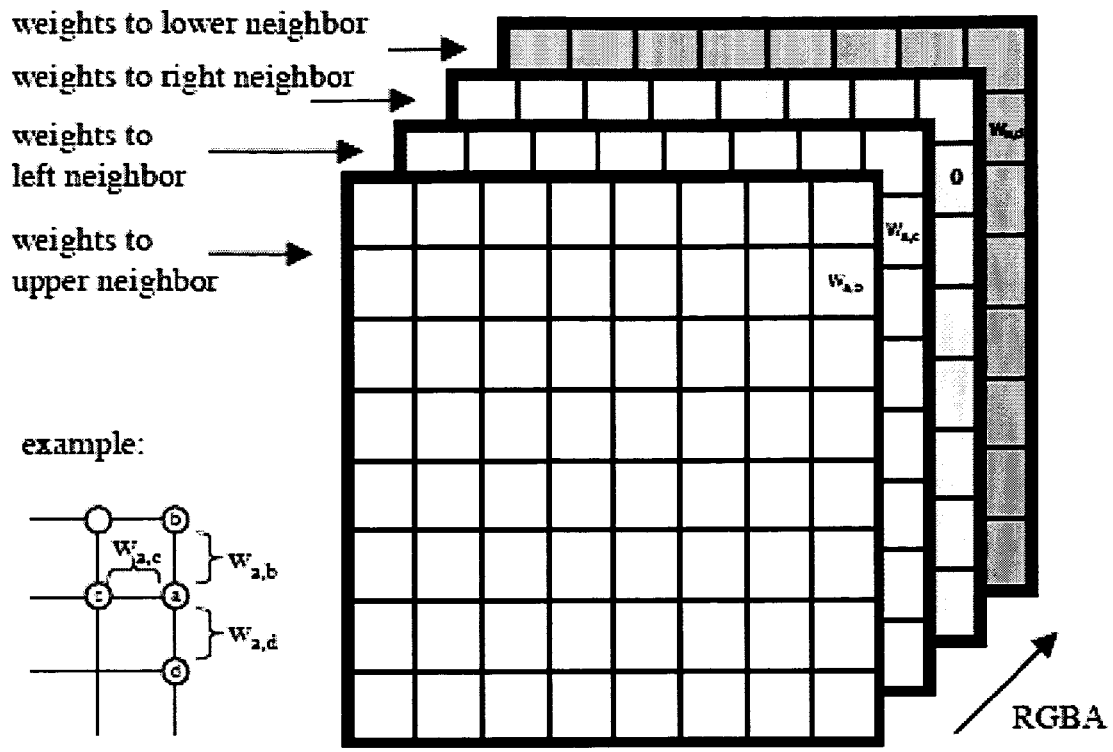
FIG. 5 is an illustration of an L-metric texture for storing four neighboring edge weights of an edge node according to an embodiment of the present disclosure.

FIG. 5 illustrates the L-matrix texture storing the four neighboring edge weights of each node. The main diagonal can be computed by summing the four edge weights at each node.

The edge weights $w_{i,j}$ are determined by $$w_{ij} = \exp(-\beta(I_i - I_j)^2) \quad (1)$$

were $I_i$ and $I_j$ are the image intensities at pixels i and j, respectively.

A single rendering pass is required to calculate the edge weights and store the Laplacian matrix in its texture representation.

Furthermore, only one rendering pass is needed to determine a matrix-vector multiplication as described herein.

For the matrix-vector multiplication, with the Laplacian matrix structure the matrixvector multiplication can be determined in a single rendering pass. At each pixel location the vector is fetched together with its four neighbors. Those five values need to be multiplied with the five matrix diagonals component-wise. The four secondary bands can be fetched by sampling the Laplacian texture at the current position. The main diagonal is the sum of the secondary diagonals. The pixel shader code below shows an implementation of a matrixvector product.

```
float4 psMatrixVector (PosTex5 v) : COLOR {
    // get Laplacian matrix (secondary diagonals)
    float4 L = tex2D (sam0, v.TexCoordsC);
    // get Laplacian main diagonal
    // dot (L, 1) = L.r + L.g + L.b + L.a
    float diag = dot (L, 1);
    // sample vector
    float4 vecc = tex2D (sam1, v.TexCoordsC); // center
    float4 vecu = tex2D (sam1, v.TexCoordsU); // up
    float4 vecl = tex2D (sam1, v.TexCoordsL); // left
    float4 vecr = tex2D (sam1, v.TexCoordsR); // right
    float4 vecd = tex2D (sam1, v.TexCoordsD); // down
```

-continued

```
    return diag*vecc - L.r*vecu - L.g*vecl
        - L.b*vecr - L.a*vecd;
}
```

Assuming the Laplacian texture to be bound to sampler unit 0 (sam0), the four edge weights of the current texel are read and stored in the four-component vector L. Now the secondary diagonal entries of the current pixel (node) are present in the RGBA components of L. The next line computes the main diagonal value by summing up all secondary values. The fastest way to sum up four components on the GPU is by calculating a dot product of the vector with 1, since it is a one cycle operation.

$$dot(L,1)=(1 \times L.r)+(1 \times L.g)+(1 \times L.b)+(1 \times L.a)$$

The vector texture is supposed to be bound to sampler unit 1 (sam1). Using five sets of texture coordinate interpolators the address determination for neighboring texels is done in the vertex unit, thus saving instructions in the pixel shader. With that, the vector is sampled and stored in the vec[x] variables.

The matrix-vector product, and output texture, can be determined by multiplying the vector data vec[x] by the matrix entries diag and L.

For the solution of a system of linear equations, while the Random Walker method allows an arbitrary number of label colors, a GPU implementation according to an embodiment of the present disclosure is most efficient when using multiples of four, due to the RGBA channels of a texture. Here yellow, red, green and blue are used to represent those colors. Each color is assigned to one channel of RGBA.

Figure 6:
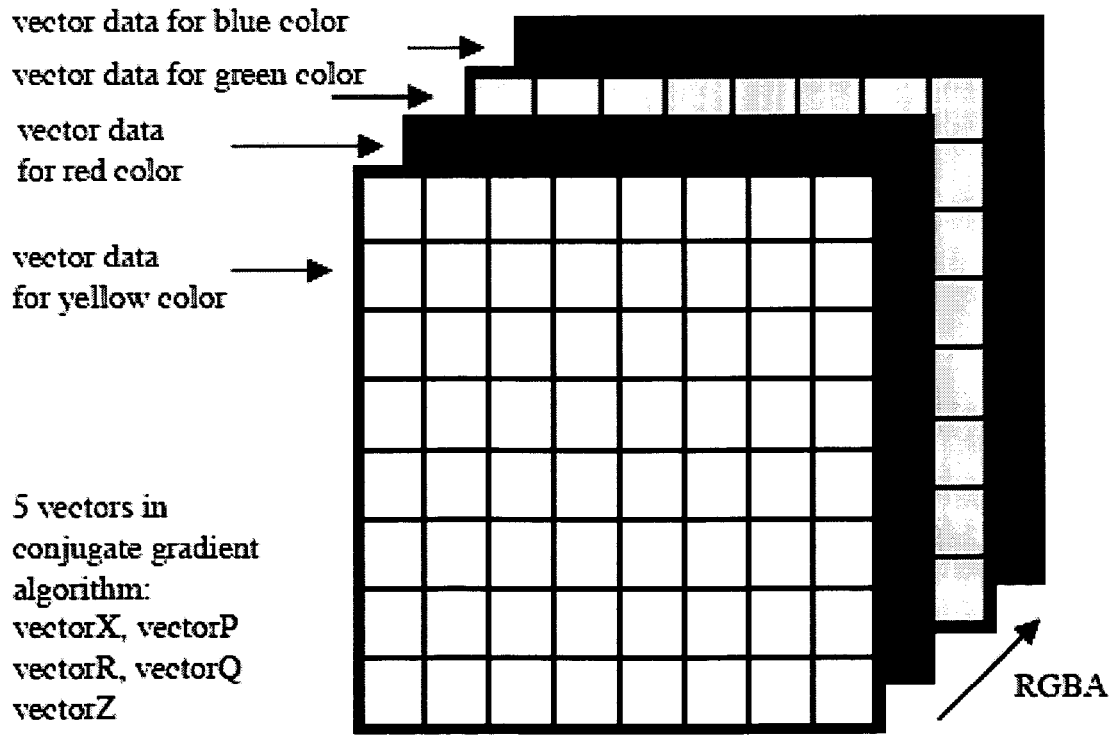
FIG. 6 is a conjugate gradient vector according to an embodiment of the present disclosure.

Five vectors or textures are needed to determine a conjugated gradient algorithm: X,P,R,Q,Z. In total this takes about 35 MB of memory for a $512^2$ image and less than 10 MB for a $256^2$ image. FIG. 6 illustrates a conjugate gradient vector stored in a texture for four different colors.

The conjugate gradient method finds a nearest local minimum of a function of n variables that presupposes that the gradient of the function can be determined. The conjugate gradient method uses conjugate directions for going downhill. The vicinity of the minimum has the shape of a long, narrow valley. The method proceeds by generating vector sequences of iterates, which are successive approximations to the solution, residuals corresponding to the iterates, and search directions used in updating the iterates and residuals. In each iteration of the method, two inner products are performed to determine update scalars that are defined to make the sequences satisfy certain orthogonality conditions. On a symmetric positive definite linear system these conditions imply that the distance to the true solution is minimized in some norm.

For each color a system of linear equations has to be solved. Further, all four systems (e.g., yellow, red, green and blue) are solved simultaneously, because all operations on vectors and matrices are done in parallel for all colors. This allows to solve four linear systems at the cost of one. Needed GPU operations are vector addition, dot product and matrix-vector product. The solution of the system of equations gives probabilities that a node corresponds to each label. A segmentation result is determined from the probabilities, labeling each node according to a most probable label. The system and method may be implemented using two or more labels.

FIGS. 7A-D illustrate a random walker approach to segmentation. With three seed points representing three different labels (denoted L1 701, L2 702, L3 703), alternately fix the potential of each label to unity (i.e., with a voltage source tied to ground) and set to zero (i.e., ground) the remaining nodes. The electric potentials determined represent the probability that a random walker starting at each node first reaches the seed point currently set to unity. The probabilities correspond to whether a node belongs to a portion of the image labeled by seed points.

Figures 7A, 7B:
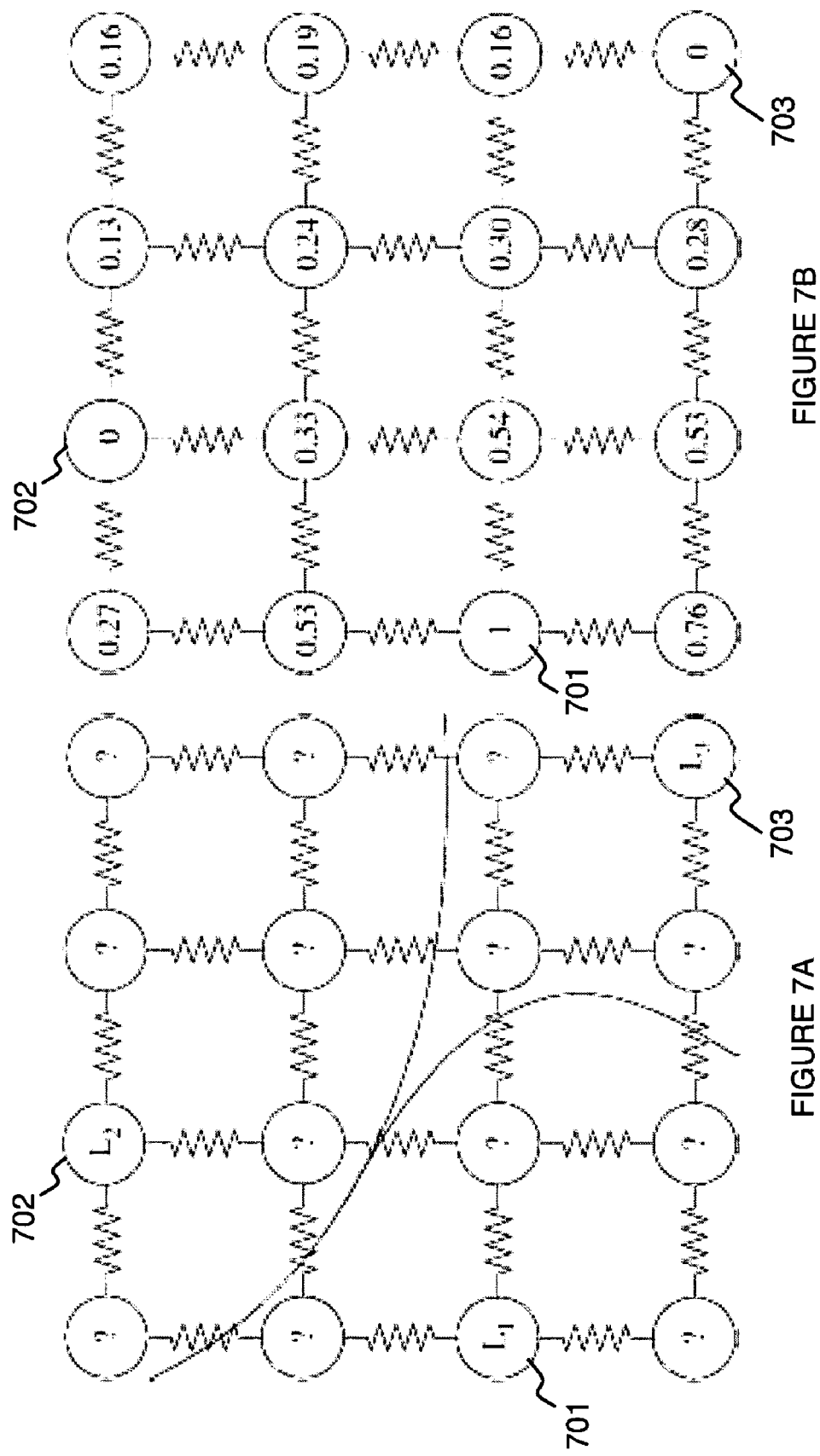

FIG. 7A shows the initial seed points 701-703 and the segmentation resulting from assigning each node the label that corresponds to its greatest probability. FIGS. 7B-D shows the probability that a random walker starting from each node first reaches seeds L1 701, L2 702 and L3 703, respectively. For illustration, all the weights (resistors) were set to unity. In the case of an image, these resistors would be a function of the intensity gradient. The reader can verify that the probabilities at each node sum to unity (up to rounding).

Figure 8:
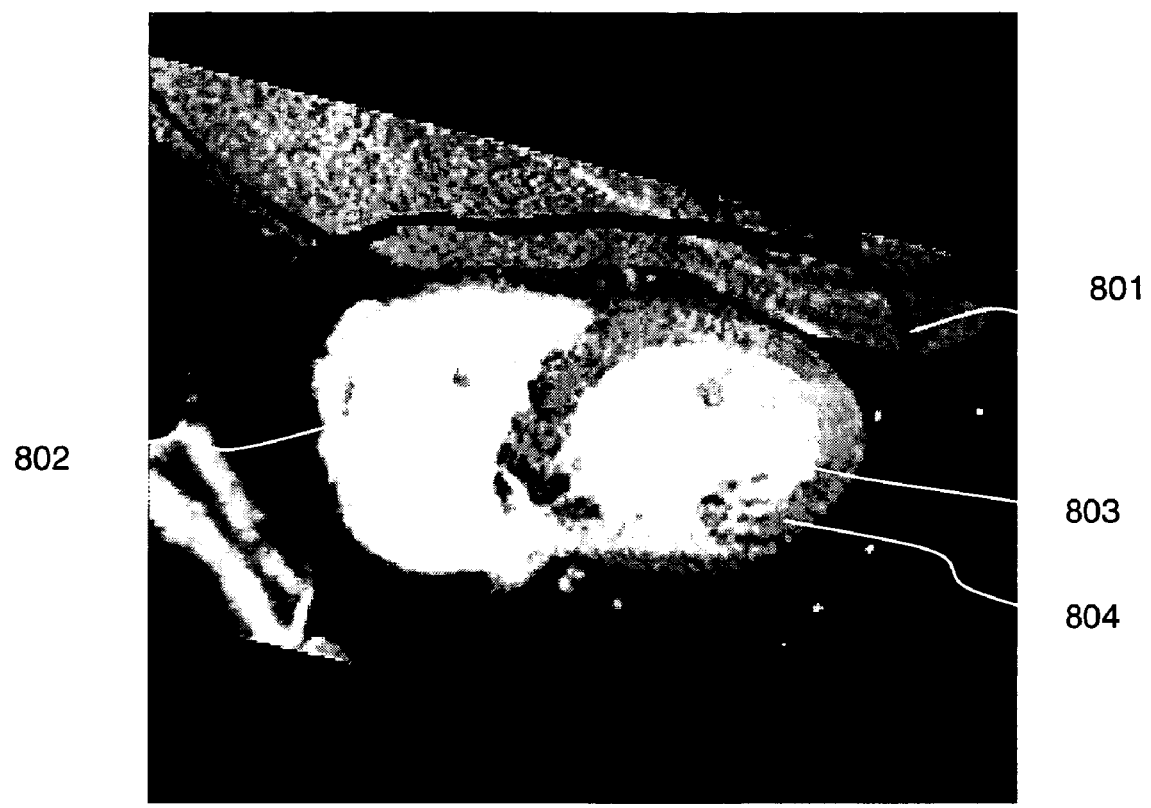
FIG. 8 is an illustration of seed points in an image of interest according to an embodiment of the present disclosure.

Thus, for example, different portions of a myocardial image may be labeled with two or more RGBA labels, such as yellow labeling blood, red labeling a wall and blue labeling tissue outside of the heart. A probability that a node is a yellow (blood), red (wall) or blue (outside) is determined for each node and the node is labeled corresponding to the most probable label. For example, FIG. 8 shows a myocardial image including seed points, e.g., 801-805, corresponding to different tissue. As shown in FIG. 8, a seed point may be connected or disconnected, for example, seed 802 is disconnected, including three points designating an atrium wall.

A method for GPU accelerated segmentation is applicable to different image types, e.g., CT and MR images, JPEG images and the like, for object identification, automated differentiation, analysis, etc.

Having described embodiments for a system and method for multi-label harmonic potential segmentation, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. An image segmentation device comprising:
   a memory device storing an image of interest and a plurality of instructions for segmenting the image of interest; and
   a graphics processing unit for receiving the image of interest and executing the plurality of instructions to perform a method comprising,
      specifying a plurality of seed points in the image of interest;
      determining a graph of nodes representing the image, wherein each node corresponds to a pixel of the image and neighboring edge weights between neighboring nodes represent differences in image intensities between neighboring pixels, wherein determining the graph comprises determining a Laplacian matrix having five diagonal bands, wherein four secondary bands hold the edge weights and a main band is a sum of the four secondary bands and storing the Laplacian matrix of edge weights as a texture representation having a plurality of channels;
      determining a vector texture of vector data representing different potential labels of the nodes, the vector data for each label is determined by matrix-vector multiplication of the secondary diagonals, the main band, and a sample vector for each node from the first texture;

determining a probability that a node of the graph belongs to each potential label, wherein the probabilities are determined for each node in parallel as a conjugate gradient vector of the vector texture;

assigning each node a most probable label based on the probabilities; and outputting a segmentation of the image of interest according to label assignments to the nodes, wherein the segmentation differentiates portions of the image of interest.

2. The image segmentation device of claim 1, further comprising determining edge weights between neighboring nodes in the graph.

3. The image segmentation device of claim 1, further comprising:

determining the sum for each node; and determining a vector of the sums for each channel, the channel being colors associated with the potential labels.

4. The image segmentation device of claim 3, wherein determining the sum for each node further comprising determining a dot product of the neighbors for each node.

5. The image segmentation device of claim 1, further comprising determining the probabilities by conjugate gradient vector.

6. A computer readable medium embodying instructions executable by a processor to perform a method for image segmentation, the method comprising:

specifying a plurality of seed points in an image of interest;

determining a graph of nodes representing the image, wherein each node corresponds to a pixel of the image and neighboring edge weights between neighboring nodes represent differences in image intensities between neighboring pixels, wherein determining the graph comprises determining a Laplacian matrix having five diagonal bands, wherein four secondary bands hold the edge weights and a main band is a sum of the four secondary bands and storing the Laplacian matrix of edge weights as a texture representation having a plurality of channels;

determining a vector texture of vector data representing different potential labels of the nodes, the vector data for each label is determined by matrix-vector multiplication of the secondary diagonals, the main band, and a sample vector for each node from the first texture;

determining a probability that a node of the graph belongs to each potential label, wherein the probabilities are determined for each node in parallel as a conjugate gradient vector of the vector texture;

assigning each node a most probable label based on the probabilities; and outputting a segmentation of the image of interest according to label assignments to the nodes, wherein the segmentation differentiates portions of the image of interest.

7. The computer readable medium of claim 6, further comprising determining edge weights between neighboring nodes in the graph.

8. The computer readable medium of claim 6, further comprising:

determining the sum for each node; and determining a vector of the sums for each channel, the channel being colors associated with the potential labels.

9. The computer readable medium of claim 8, wherein determining the sum for each node further comprising determining a dot product of the neighbors for each node.

10. The computer readable medium of claim 6, further comprising determining the probabilities by conjugate gradient vector.

* * * * *